United States Patent
Chew et al.

(10) Patent No.: US 7,773,504 B2
(45) Date of Patent: Aug. 10, 2010

(54) BANDWIDTH ALLOCATION FOR NETWORK PACKET TRAFFIC

(75) Inventors: Yen Hsiang Chew, Penang (MY);
Shanggar Periaman, Butterworth (MY);
Kooi Chi Ooi, Teluk Kumbar (MY);
Bok Eng Cheah, Teluk Kumbar (MY)

(73) Assignee: Intel Corporation, Santa Clara, CA (US)

( * ) Notice: Subject to any disclaimer, the term of this patent is extended or adjusted under 35 U.S.C. 154(b) by 129 days.

(21) Appl. No.: 11/901,070

(22) Filed: Nov. 13, 2007

(65) Prior Publication Data

US 2009/0122702 A1    May 14, 2009

(51) Int. Cl.
*H04L 12/28* (2006.01)
*G06F 15/16* (2006.01)
*G06F 3/00* (2006.01)

(52) U.S. Cl. .................. 370/229; 709/235; 710/57
(58) Field of Classification Search ......... 370/229–236; 710/57; 709/235
See application file for complete search history.

(56) References Cited

U.S. PATENT DOCUMENTS

| | | | | |
|---|---|---|---|---|
| 4,378,588 A | * | 3/1983 | Katzman et al. | 710/57 |
| 4,380,063 A | * | 4/1983 | Janson et al. | 370/235 |
| 4,500,990 A | * | 2/1985 | Akashi | 370/235 |
| 5,257,258 A | * | 10/1993 | Birman et al. | 370/235 |
| 5,867,480 A | * | 2/1999 | Thomas et al. | 370/230 |
| 6,167,029 A | * | 12/2000 | Ramakrishnan | 370/235 |
| 6,477,143 B1 | * | 11/2002 | Ginossar | 370/235 |
| 6,735,174 B1 | * | 5/2004 | Hefty et al. | 370/235 |
| 6,785,236 B1 | * | 8/2004 | Lo et al. | 370/235 |
| 6,851,000 B2 | * | 2/2005 | Lai | 710/57 |
| 7,000,061 B2 | * | 2/2006 | Varma et al. | 370/235 |

* cited by examiner

*Primary Examiner*—Steven H Nguyen
(74) *Attorney, Agent, or Firm*—Blakely, Sokoloff, Taylor & Zafman LLP (57) ABSTRACT

Bandwidth is allocated among network interfaces of, for example, a switch, router, or server among based on network packet traffic. In one example the network device has a plurality of network interfaces, a performance monitoring unit to monitor buffer events for the network interfaces and to generate an interrupt if a network interface buffer is near an overflow state, and a processor to receive the interrupt and increase a priority of the associated network interface in response thereto.

18 Claims, 6 Drawing Sheets

BANDWIDTH ALLOCATION FOR NETWORK PACKET TRAFFIC

BACKGROUND

1. Field

The present invention relates to the field of managing network traffic in a network device and in particular to adjusting queue priorities among different network interfaces based on traffic demand.

2. Related Art

Network traffic systems typically present several network interfaces that all share resources. In order to maximize the speed of the system, all of the interfaces must be occupied all of the time. However, the traffic presented at each interface will depend upon the demand presented by the corresponding nodes to which the interface is connected. These traffic demands are likely to change over time and change differently from the traffic presented at other interfaces.

In order to obtain equilibrium in the traffic at each interface, complex system software is used. The system software may also interact with customized hardware support to monitor an entire local area network or networking system. The system then performs calculations to determine the distribution of network packet loads at each network interface in the entire system. Using this information, the system's network routing table can be changed to balance out the load across all of the interconnected routers or switches.

The system software in many instances gathers its needed information by continuously polling each and every router for network traffic information.

BRIEF DESCRIPTION OF THE DRAWINGS

The invention may be more fully appreciated in connection with the following detailed description taken in conjunction with the accompanying drawings, in which like reference numerals refer to corresponding parts throughout the several views of the drawings, and in which.

DETAILED DESCRIPTION

Figure 1:
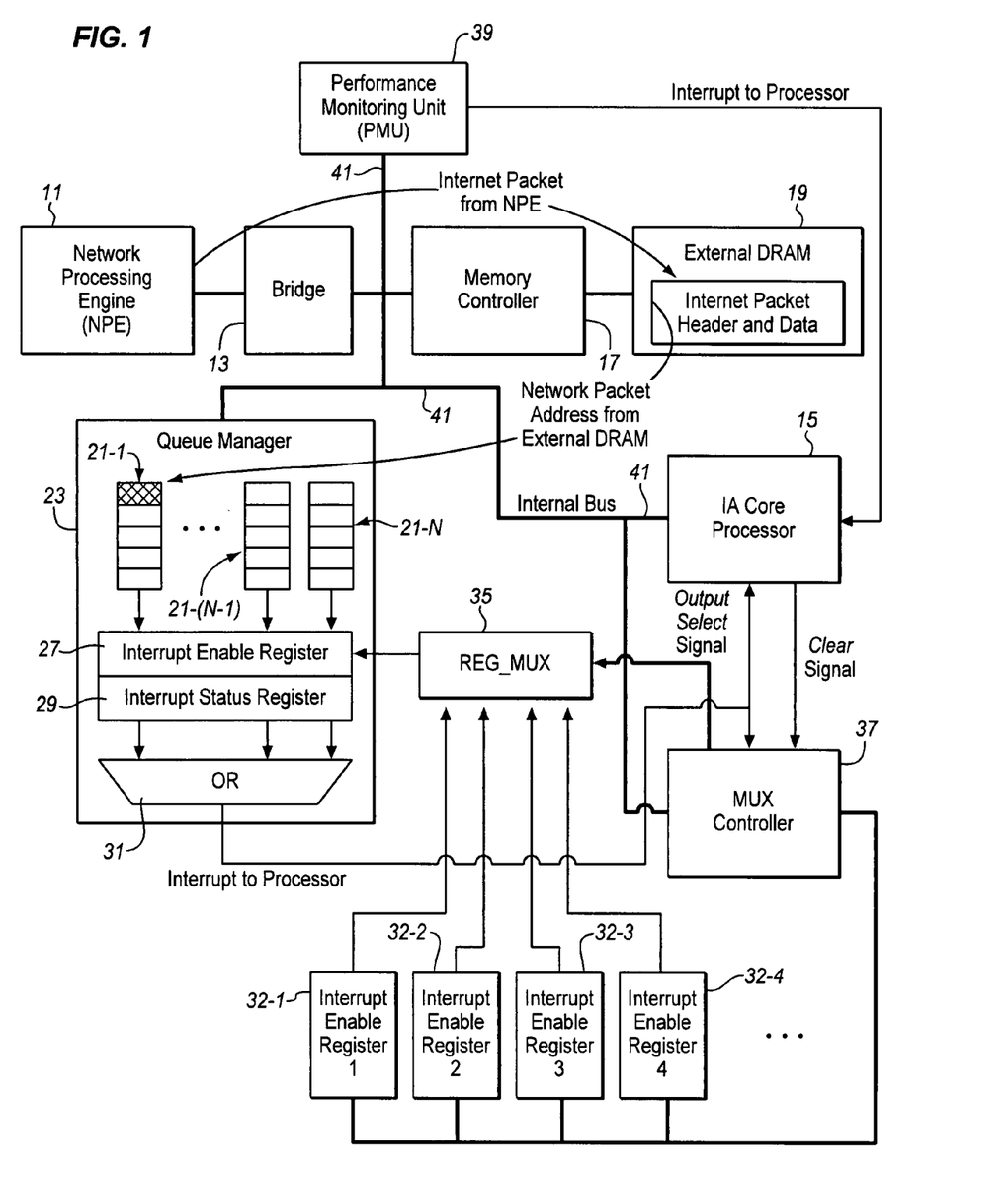
FIG. 1 is a block diagram of portions of a network device, such as a router, switch, or server according to an embodiment of the invention.

FIG. 1 shows an example hardware configuration of a network device, such as a router, switch, server, or other node, that supports one or more network interfaces. While embodiments of the present invention are described in the context of FIG. 1, the ideas, methods, and devices described herein may be applied to a variety of different hardware architectures and system designs.

In the example of FIG. 1, internet or other types of network data packets are received at a Network Processing Engine (NPE) 11. The NPE is coupled to a bridge 13, such as a North Bridge, South Bridge, Firmware Hub (FWH) or any other type of data bridge. The bridge 13 is coupled to a processor 15 that controls the system. The processor may be an Intel® architecture processor or any of a variety of different types including controllers, microcontrollers or other processors, including low power core processors and XScale processors.

The bridge is also coupled to a memory controller 17 that is, in turn, coupled to an external memory device, such as a DRAM 19 (Dynamic Random Access Memory). The memory is used for temporary storage and so any of a variety of different memory devices and types of memory with different interfaces may be used. In the present example, data packets received at the NPE are stored in the external DRAM while the address of the packet is written to one of a set of queues based on their relative priority of the data packet.

The data queues 21 may be implemented as a set of FIFO (First In First Out) registers inside a queue manager 23. The queue manager is coupled to the NPE and the external DRAM through the bridge. Each queue is coupled to both an interrupt enable register 27 and an interrupt status register 29 within the queue manager 23. Individual bits in the interrupt status register 29 are OR'd together by a logic OR gate 31. When at least one bit in an interrupt status register is set to high then it is sent in combination with any other interrupts to the processor 15. Interrupts may be sent on a specific line, as shown, or in any other way.

When a queue gets filled up to the level of a threshold, its corresponding interrupt status bit in the interrupt status register 29 may be set, and an interrupt may be asserted through the OR gate 31 to the embedded core processor 15 inside the communication processor. The interrupts request the core processor to process the packets in the respective queue. In one embodiment, the interrupt has a pointer to a particular queue inside the address manager from which the interrupt was asserted.

The processor may then examine the status registers in the queue manager to determine the queue that caused the interrupt and then process the request accordingly. Interrupts from these queues, unless the interrupts have been masked out by the interrupt enable register 27, may be processed in any desired fashion, such as a simple round robin approach, an ordered priority approach or using Quality of Service (QoS) indicators. Any of a variety of other approaches may also or alternatively be used, depending on the particular implementation.

In addition to the components discussed above, the network device of FIG. 1 also includes interrupt enable registers 32-1, 32-2, 32-3, and 32-4. The number of interrupt enable registers may be increased to allow for greater flexibility in controlling QoS (Quality of Service) or decreased for less flexibility, although only four are shown for simplicity. Each interrupt enable register is coupled to a registration multiplexer (REG_MUX) 35, to be used for selecting one output from among all of the interrupt enable registers that will be used to mask interrupts from the queues inside the queue manager based on the rules or conditions described below.

A MUX Controller 37 is coupled to each of the interrupt enable registers to control the contents of each register. The MUX Controller is also coupled to the processor 15 which controls the operation of the MUX controller.

Considering the interrupt enable registers in more detail, as mentioned above, the outputs of the all of the registers are multiplexed at the REG_MUX 35. The values in the registers may be programmed by the processor 15 through the MUX Controller 37. The total number of registers may be adapted to suit any particular implementation. In one example, the total number is a power of two, and the width of each register equals the total number of queues supported by the communication processor. This is reflected in the number of queues 21 in the queue manager.

The MUX Controller 37 in addition to controlling and programming the values stored in the programmable interrupt enable registers has an additional control output to the REG_MUX 35. This control line carries an output select signal that controls which of the interrupt enable register values are to be provided to the queue manager. Through this line, the processor, acting through the MUX Controller may be able to communicate with the REG_MUX and control the operation of the queue manager.

The system of FIG. 1 further includes an internal performance monitoring unit (PMU) 39. In one embodiment, this device is used for debugging and testing purposes as well as for the functions and operations described above. The PMU 39 is coupled to an internal bus 41. In the described architecture, this internal bus couples data and control by and between the bridge 13, the memory controller 17, the queue manager 23, the processor 15 and the MUX controller 37. Such a bus is sometimes referred to as the system bus, or the high speed bus. This bus may actually be made up of several different buses with different connectors, protocols, and data standards. The buses together act as a single bus in that data may be passed from one component to another quickly and largely uninterrupted through the entire path. However, the particular physical signaling characteristics of the data may be altered along the way.

The PMU 39 is able to use its bus connection to monitor traffic on the bus and to send interrupts to the processor. In one embodiment, the PMU monitors many signals from different blocks inside the system of FIG. 1, for example FIFO or data buffer overflow and underflow from Ethernet ports, bus utilization, etc. This may be accomplished, for example, by having dedicated status signals (not shown) from the respective blocks routed into the PMU. As mentioned above, data packets from the NPE 11 may be sent to the external DRAM 19 and their corresponding headers stored in queues inside the queue manager 23 based on their relative priority, until they are serviced by the processor.

The PMU 39 may be configured to be able to monitor, observe or count all of this traffic as well as many other conditions of various internal and network interfaces. While the PMU may be a specifically adapted hardware device designed for only the purposes described herein, it may also be created by adding functions to existing devices. For example, an Intel ® NOA (Node Observability Architecture) or CHAP (Chipset Hardware Architecture Performance) module may also be used. Other types of monitoring, maintenance and debugging devices may also be used.

In operation, the hardware of FIG. 1 may be used to perform a variety of quality monitoring, traffic control and resource allocation functions. In one example, the interrupt enable registers are used to process Quality of Service (QoS) processing for the incoming internet packets. This may be done by the MUX Controller by periodically swapping the values of the interrupt enable registers 27 inside the queue manager 23 over a period of time. As a result, within any given time frame, only queues that had their interrupts enabled are allowed to interrupt the processor. At the same time, interrupts from other queues are momentarily disabled. In this way, the MUX Controller determines which queues will be serviced. This may be done irrespective of traffic loading or timers for the queues.

Considering this control of the interrupts in more detail, consider an interval of time or time frame T. In time interval T, each bit value written with a ONE for a register inside an interrupt enable register enables a queue to be given service for some number of internet packets within that time frame T. (Call the number of packets within time interval T, NUM).

The maximum total number of packets capable of being supported by the network interface device, such as the system of FIG. 1, may be written into a semaphore protected memory or cache location. This value can be called PACKET_COUNT. Accordingly, PACKET_COUNT keeps track of the total number of available packet tokens based on the expected capability of the device to process real packets in actual operation. The number of packet tokens is like a bandwidth allocation budget for packet handling based on the capabilities of the network device and the network. This budget limits the total amount of bandwidth that can be allocated to the network interfaces.

When a queue is initialized; the processor is able to assign to the queue some number of packets that can be serviced by the processor within the time interval T. (This number can be called Q_NUM). An internal enable register is initialized by writing an appropriate number of enables into the register. In the illustrated embodiment, that number is written into the register as a number of ONES. The queue is initialized, at least in part, by treating Q_NUM as a number of tokens and subtracting it, from PACKET_COUNT and then writing an equivalent number of ONES into the appropriate bit locations of the interrupt enable registers.

The interrupt enable registers 32-1 to 32-4 serve as an interrupt enable mask. The number of interrupt enable registers may be selected to suit any particular application. In the example of FIG. 1 four are shown. The number of interrupt enable registers can be scaled to provide greater or lesser QoS flexibility. For example, if the number of masks is increased from 8 to 16 then there will be a greater number of slots for a user to write ONES and ZEROES for greater variation in the number of packets each network stream can send within the allotted time interval T. The priority and similarly the bandwidth of a network stream or queue is determined by counting the number of ONES across all the interrupt enable registers. The REG_MUX 35 cycles through each interrupt enable register in a time interval, T, to individually mask out interrupts of queues inside the queue manager. The processor services some number of packets, NUM, for each network stream that requests service and that also has a ONE in the corresponding interrupt enable bit in the interrupt enable register. In the event that all of the queues are consistently full, the bandwidth available to a network stream is determined by the number of ONES in the corresponding registers.

The relative bandwidth for each stream may be adjusted by changing the register values, however, the total number of ONES available is limited, in this example, by the total packet token count. Accordingly, if all of the tokens are already allocated, then ONES must be taken from one register in order to give them to another. To change the priority of a single network stream or queue typically several interrupt enable registers are changed, however, the particular manner in which priority is changed will depend on how the registers, controllers, multiplexer and interrupts are configured.

In one embodiment, each time an interrupt from the queue manager 23 is sent to the processor 15 to service packets in the queue, the processor 15 may read the interrupt status register 29 and service queues that had asserted their interrupts without being masked out. In one example, only queues that have their corresponding interrupt enable bits set to ONE are able to receive service. A total number of packets, NUM, will be serviced for each queue in one round of QoS processing of data packets. After every queue is serviced, the MUX controller 37 will advance the REG_MUX 35 to select the next interrupt enable register for masking off interrupts in the next round of QOS processing of data packets. The QoS processing of data packets is thereby achieved by varying the total of number and bit positions of ONES in each interrupt enable register.

Each time network or system conditions change, the PMU 39 may detect the change and send an interrupt to the processor 15. The processor may read the condition changes from the PMU and dynamically adjust queue priorities by changing the number of ONES in one or more of the interrupt enable registers (32-1 . . . 32-4, etc.). Adding a ONE into an interrupt enable register consumes one unit of Q_NUM from PACKET_COUNT. In other words, there is a limited number of ones available based on the capabilities of the network device, among other factors. This limited number is expressed, in the present example, in the value of the variable PACKET_COUNT. If PACKET_COUNT reaches zero, then the queues have consumed all of the available packet processing bandwidth of the network device. The priority of one queue can not be increased without decreasing the priority of another.

If the PACKET_COUNT is zeroed. In other words, if all of the packet tokens have been used, then the processor 15 may inform its adjacent or central host switch or router that it is not able to service additional requests and that new network streams may be delayed unless they are routed to a different, for example, an adjacent, switch or router for servicing. Of course, priorities may still be adjusted by writing ZEROES where there were ONES and then writing ONES in other registers where there were ZEROES.

Using these registers the interrupt enable registers, the priority of a queue may be changed by writing more ONES into the register. In one embodiment, to increase a queue's priority, the processor may deduct packet tokens from PACKET_COUNT and proportionally increases the number of ONES written to the dedicated bit positions of the interrupt enable registers.

Similarly, the priority of a queue may also be decreased. In one embodiment, to decrease the priority of a queue, the processor may return packet tokens to PACKET_COUNT and proportionally decrease the number of ONES in the corresponding bit positions of the interrupt enable registers.

Figure 2:
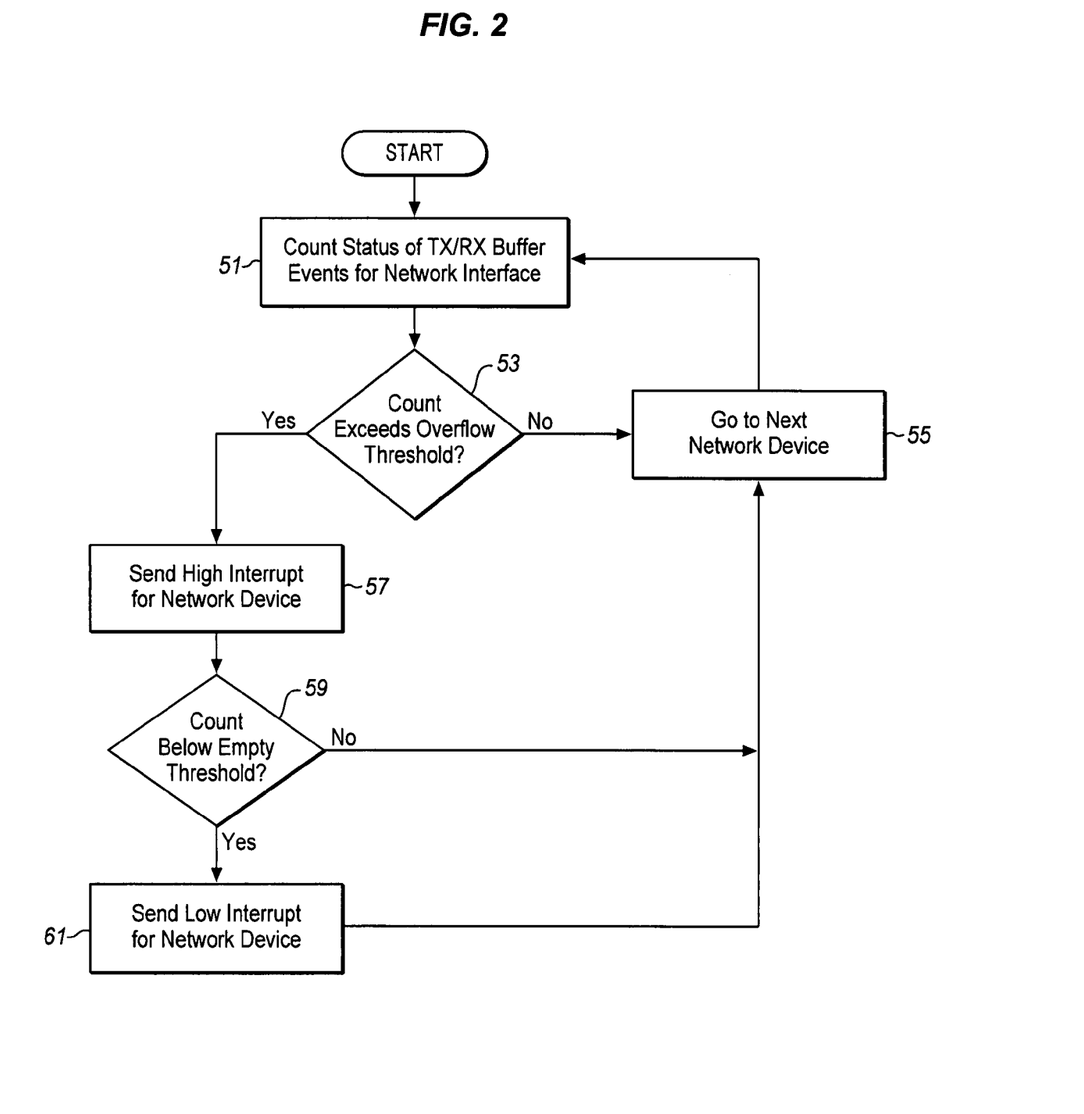
FIG. 2 is a process flow diagram of operations that may be performed by a performance monitoring unit to monitor packet queue underflow and overflow conditions according to an embodiment of the invention.

Considering FIG. 2, the operations of the PMU 39 are shown in the form of a flow chart. As mentioned above the PMU may be a specific new hardware item designed for this purpose only, or it may be developed for some other purpose and then adapted to perform these functions. A typical performance monitoring unit DFX (Design for X, any of a variety of built-in diagnostic modules), CHAP, or NOA device fall into this category. The PMU may further be integrated into any of the devices that access the internal bus 41. Accordingly, it may be part of a chipset or bridge rather than a separate, discrete component as shown in the drawings. The PMU may continuously monitor the status of transmit and receive buffer events of all of the network interfaces supported by the processor/chipset system or any other portion of the network device.

In FIG. 2, the PMU 39 performs the monitoring by counting the events in the transmit and receive buffers for one of the network interfaces at block 51. These buffers correspond in FIG. 1 to the external DRAM buffers 19. However, other buffers, such as the queues 21 may be counted instead. The count for the transmit and receive buffers are compared to a threshold at block 53. This threshold is referred to in FIG. 2 as an overflow threshold and indicates that an overflow condition for the buffer has occurred or is imminent. The value for the threshold may be preprogrammed based on the configuration and capabilities of the system or it may be set in a diagnostic or adaptive fashion. If the count is below the threshold, then the process returns to count the events for another network interface at block 55. While the receiver and transmit buffer counts are shown as being processed together, they may also be processed one at a time. In such a case, the return block 55 would return for each buffer for each device.

If the count exceeds the threshold, then at block 57, the PMU 39 sends a high interrupt for that network device. Typically, this will involve sending an interrupt to the processor on an appropriate bus. In the example of FIG. 1, the interrupt is shown as a separate connection to the processor from the PMU. However, the interrupt may be on a shared connection or bus. In another embodiment, the interrupt may be sent though a messaging protocol. The interrupt may also be sent to another component, such as a bridge or chipset. The other component may then forward the interrupt to the processor or in an alternative embodiment, the other component may process the interrupt directly without the intervention of the processor.

If the count is below a threshold, in this case the empty threshold, determined at block 59, then the PMU sends a low interrupt for that network device at block 61. After the count has been compared to both thresholds, then the process returns at block 55 to consider the next network device. This process may be repeated continuously during the operation of the device. Timers, delays and various other control algorithms (not shown) may be applied to regulate the process, depending on the particular implementation.

Many other PMU 39 conditions may be used instead of or in addition to counts of buffer events. The PMU, a processor or another system component, for example may consider a number of reads and writes to some particular network interface or network protocol supporting co-processors. Other information may also be used to determine or aid in determining the status of the network interfaces in order to dynamically adjust their queue priorities.

Figure 3:
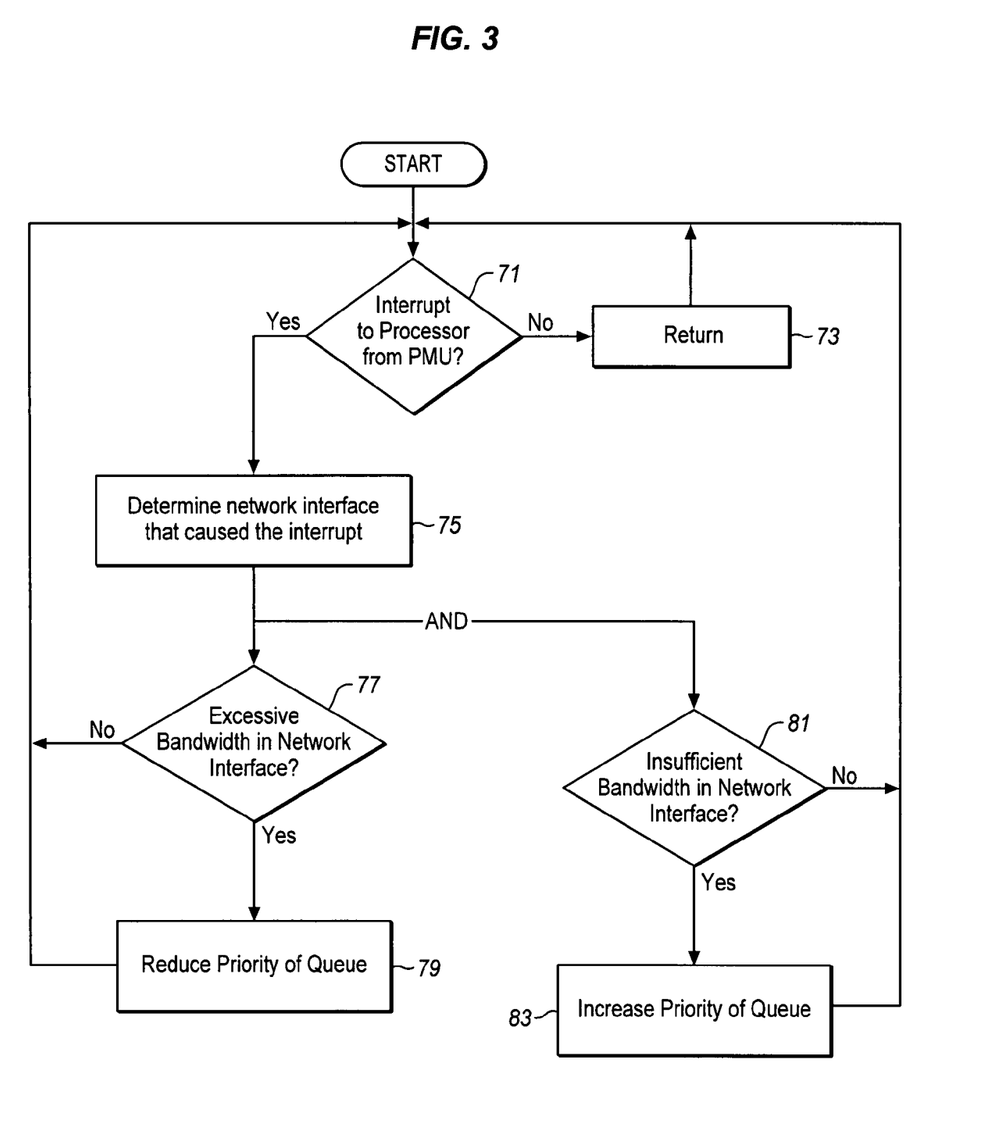
FIG. 3 is a process flow diagram of operations that may be performed by a processing engine to adjust packet queue priorities according to an embodiment of the invention.

FIG. 3 shows an example process flow performed by a processor in response to the interrupts received from the PMU. As mentioned above, these operations may alternatively be performed by another component in the system and another component may also serve as an intermediary between the PMU and the processor.

In FIG. 3, the processor, or other responsible component, determines whether an interrupt has been received at block 71. If there is no interrupt, then the process returns at block 73 to the beginning again. On the other hand, if there is an interrupt, then the processor, network processing engine (NPE), or micro-engine (ME) determines which network interface caused the interrupt at block 75.

The processor may then determine whether the interrupt is based on the overflow threshold or the empty threshold. This information may be present in the interrupt or the processor may obtain the information from the PMU 39, the queue manager or another agent. If the network device has more bandwidth than it needs, that is if the empty threshold has been exceeded as determined at block 77, then the processor may reduce the priority of the corresponding queue at block 79. This will reduce the amount of resources that are provided for that particular network device. After adjusting the priority, then the process returns to block 71. Similarly if the network device does not have excessive bandwidth, the process also returns to block 71.

At the same time, the processor may also look to see if the network interface has insufficient bandwidth at block 81. This may be indicated by the network device exceeding the overflow threshold. If this occurs, then the processor, or other appropriate component may increase the priority of the corresponding queue at block 83. This will allow the queue more access to the desired resources so that its packets will be serviced more quickly. After increasing the priority in the queue, the process returns to block 71. Similarly, if the overflow threshold has not been exceeded as determined at block 81, then the process returns to block 71.

As can be seen from FIG. 3, an interrupt that does not relate to excessive or insufficient bandwidth in a network queue will not cause the processor to adjust priorities. In addition, either the overflow threshold or the empty threshold may be exceeded but not both. Accordingly, the queue will either be increased in priority, reduced in priority or left unchanged. It may be further noted that the PMU alerts the processor of a condition, but does not resolve the condition. An advantage of this configuration is that the PMU may be a simple device with only a few connections and few processing resources. Another advantage is that the processor may use additional criteria (not shown) to determine whether the priority of a queue should be changed. These criteria may include anticipated loads, diagnostic information, priority ranking, subscription levels and other factors.

Figure 4:
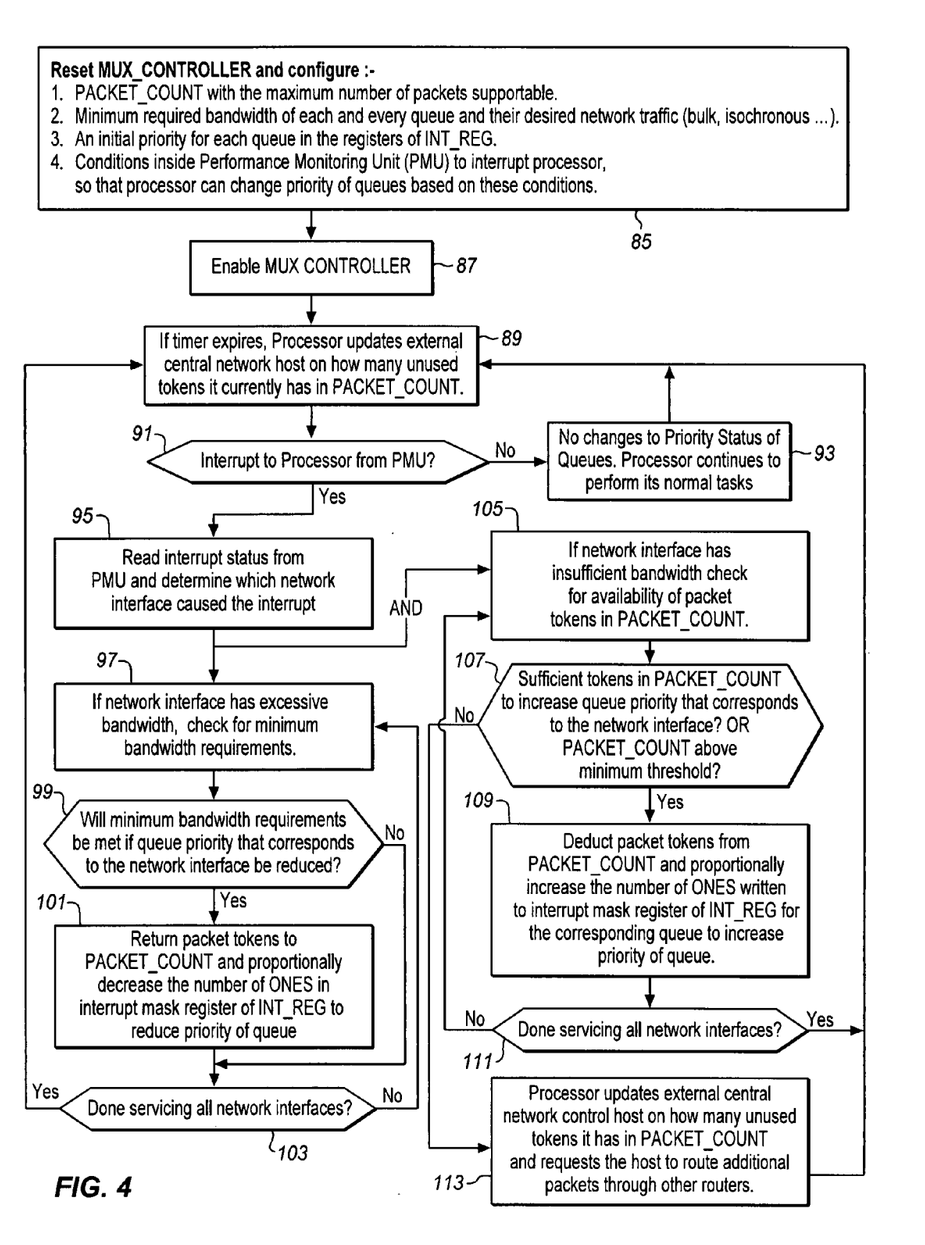
FIG. 4 is a process flow diagram of operations of a network device to manage packet queue priorities according to an embodiment of the invention.

FIG. 4 presents the processes of FIGS. 2 and 3 with more detail and some additional optional processes. The example of FIG. 4 begins at block 85 with resetting and configuring the MUX Controller 37 shown for example in FIG. 1. This includes setting the PACKET_COUNT value mentioned above, setting the minimum bandwidth required for each queue, setting initial priorities for each queue, and initializing the PMU.

The PACKET_COUNT value is a parameter that is limited by the capabilities of the router or switch, such as the one shown in FIG. 1. This value may be set by an administrator based on an assessment of the system or automatically based on a real time or periodic assessment of the system, its connections, and its capabilities. For example, a network device interface equipped for Gigabit Ethernet may suggest one value, but if it is connected to a router that handles only DSL (Digital Subscriber Line) traffic, then the actual capabilities may be less.

The minimum bandwidth required by each queue will depend upon the desired network traffic, the type of network traffic (bulk, isochronous, etc.) and the hardware resources available to service the desired traffic.

The initial priority of the each queue may be set in any of a variety of different ways and may contemplate Quality of Service concerns, relative access to a bus or any other criteria. These values are set in the interrupt enable registers (INT_REG) 32 of FIG. 1 for each queue.

Finally, the initialization of the PMU 39 may involve resetting counters, setting the overflow and empty thresholds, clearing interrupt records and other operations. It may also include setting the PMU to perform the buffer monitoring operations instead of other operations that it may also be capable of performing.

At block 87, the MUX Controller is enabled and, accordingly, at block 89, the monitoring begins. The processor or other responsible component periodically updates a central network host about how many unused tokens it currently has in the PACKET_COUNT value. There are a variety of other network management tasks that the processor may also perform with central hosts and other nodes of the network. In the example of FIG. 4, this reporting is done each time a timer expires.

At block 91, the processor determines whether it has received an interrupt from the PMU. As mentioned above, the PMU is monitoring transmit and receive buffers and sending interrupts when conditions are exceeded. If no interrupt has been received, then at block 93, the processor continues to perform other tasks. No changes are made to the priority status of any of the queues. It may be noted that the processor may change the priority of a queue for reasons other than traffic demands or buffer conditions. This may be done independently of any interrupts from the PMU.

If an interrupt has been received, then at block 95, the processor may read the interrupt status from the PMU and determine which network device is the source of the interrupt. The interrupt may be a simple interrupt that leads the processor to obtain the information from the PMU 39 or another register. Alternatively, the interrupt may be in the form of a data message that provides any desired information. This may include a timestamp, an identification of the network device and an identification of the condition, such as an overflow or empty condition. Values or measurements that are a part of the condition may also be provided.

In another embodiment, the PMU may be provided with sufficient connections and resources to both determine the condition and, instead of sending an interrupt, it may act to change a queue priority independent of the processor. This allows the processor to focus on other tasks.

From block 95, two different processes may be initiated. The left-hand flow is directed to underflow or empty conditions and the right-hand flow is directed to overflow or excess conditions. These two flows may be performed in parallel as indicated in FIG. 4 or in sequence. In addition, there may be further operations to determine which branch to take so that only one branch is taken. As another alternative, the interrupt may indicate which branch to take.

In the left-hand flow at block 97, the processor handles underflow conditions. For a network device that has excessive bandwidth, the processor first checks the minimum bandwidth conditions for the network device. Underflow will be indicated when the packet buffers are not filled, are used less often, or have a low fill rate.

At block 99, the processor determines whether the minimum bandwidth requirements of the network device will be met if the queue priority for the network device is reduced. If not, then the process skips ahead to block 103. If it will be, then the processor reduces the priority of the queue in block 101.

In the present example, to reduce the priority of the queue, the processor first returns packet tokens from the queue to the total PACKET_COUNT and then reduces the number of ONES in the interrupt enable register for the queue by a corresponding amount. In other words, the processor will reduce tokens for queues whose buffers have been empty for a pre-determined period of time and return these tokens to PACKET_COUNT to be used by other queues. This may be done only if the minimum bandwidth requirement of the queue (this is typically, but not necessarily pre-determined by a manager or administrator) is met. If the minimum bandwidth requirement for the queue will not be met, then tokens will not be removed to reduce the queue priority. However, as suggested by FIG. 3, any consideration of minimum bandwidth is not necessary to the invention.

After the priority of the queue is adjusted or not adjusted, at block 103 the processor determines whether other network interfaces require service. If not, then the process returns to block 89 at which the processor updates the central network. If there are other network interfaces that require service, then the processor returns to block 97 to check for minimum bandwidth requirements before changing queue priorities.

In the right-hand flow, the processor similarly checks at block 105 to determine whether there are additional takes available in the PACKET_COUNT to allow the priority of an overflow queue to be increased. The overflow queue corresponds to one which does not have enough bandwidth and, accordingly, its buffers overflow or come close to overflow.

At block 107, the processor determines whether there are sufficient tokens in the PACKET_COUNT to allow the priority to be increased. Alternatively, the processor determines whether the PACKET_COUNT value is above a minimum threshold.

If either test is satisfied, depending on the particular implementation, then at block 109, the processor may add packet tokens to queues whose buffers have overflowed. This may be done by subtracting tokens from the PACKET_COUNT value. Packet tokens are added in the example of FIG. 1 by increasing the number of ONES written to the interrupt mask register of the interrupt enable register. These registers affect the operation of the queues 21 inside the queue manager 23 as described above with respect to FIG. 1. As with the example of block 101 the particular registers and other mechanisms used to change the queues' priorities are provided as examples only. Different operations and mechanisms may be used to suit other configurations and implementations.

At block 111, the processor checks to determine whether there are any other network interfaces that require servicing. If not, then the process flow returns to block 89, described above. If there are additional network devices to service, then the process returns to block 105 to check the availability of packet tokens for the next queue.

It may occur that when the processor checks for available packet tokens in the PACKET_COUNT value, there will not be enough. The operation may then move to block 113. Here the processor updates the external central network control host on how many unused tokens it currently has in its PACKET_COUNT and requests the host to route additional packets through other routers. The report will indicate that the number of unused tokens is not enough to handle the load that it is experiencing. The control host may reroute packets to other routers that may relieve the load on the queues that are experiencing or near overflow. This operation may also be performed independent of the needs of any one particular network interface. If for any reason there are too few packet tokens in the PACKET_COUNT, the processor may inform a central network control host. The host may, in response, change network routing tables and route additional packet streams via other switches, devices or routers.

The processor may also periodically update the central network control host on how many unused tokens it currently has in PACKET_COUNT, or simply send an update to the host when PACKET_COUNT drops below a minimum threshold or increases above a maximum threshold. The reports may be performed in response to a change in status, such as when an interrupt is generated as described in FIGS. 2 and 4 or based on a timer. This allows the host to continuously or at least periodically track a router's available bandwidth in real-time and make informed decisions on which routers in a networking system to use for servicing additional packets.

The packet token information may be sent in a variety of different ways. The system may have a dedicated backplane or management connection. Alternatively, PACKET_COUNT information may be piggy-backed with other packets (such as IEEE (Institute of Electrical and Electronics Engineers) 1588 TimeSync packets) or broadcast by the processor to all hosts simultaneously to reduce redundancy.

In another embodiment, the maximum PACKET_COUNT may be dynamically increased or decreased by software, as appropriate, if some of the processing bandwidth is used up or released by other software applications. In other words the router or switch of FIG. 1 may also perform other tasks that consume processing resources and, thereby, limit the rate at which network traffic can be handled. Since the demands of other tasks may change with time, the rate at which packets are sent and received may also be changed accordingly.

When writing into the interrupt mask registers, the processor may attempt to maintain' isochronous behavior for each queue by interleaving ONES and ZEROES written into INT_REG registers for individual queues. The interleaving may be updated, enhanced, or improved whenever the priority of a queue changes and isochronous queue behavior is desired.

Figure 5:
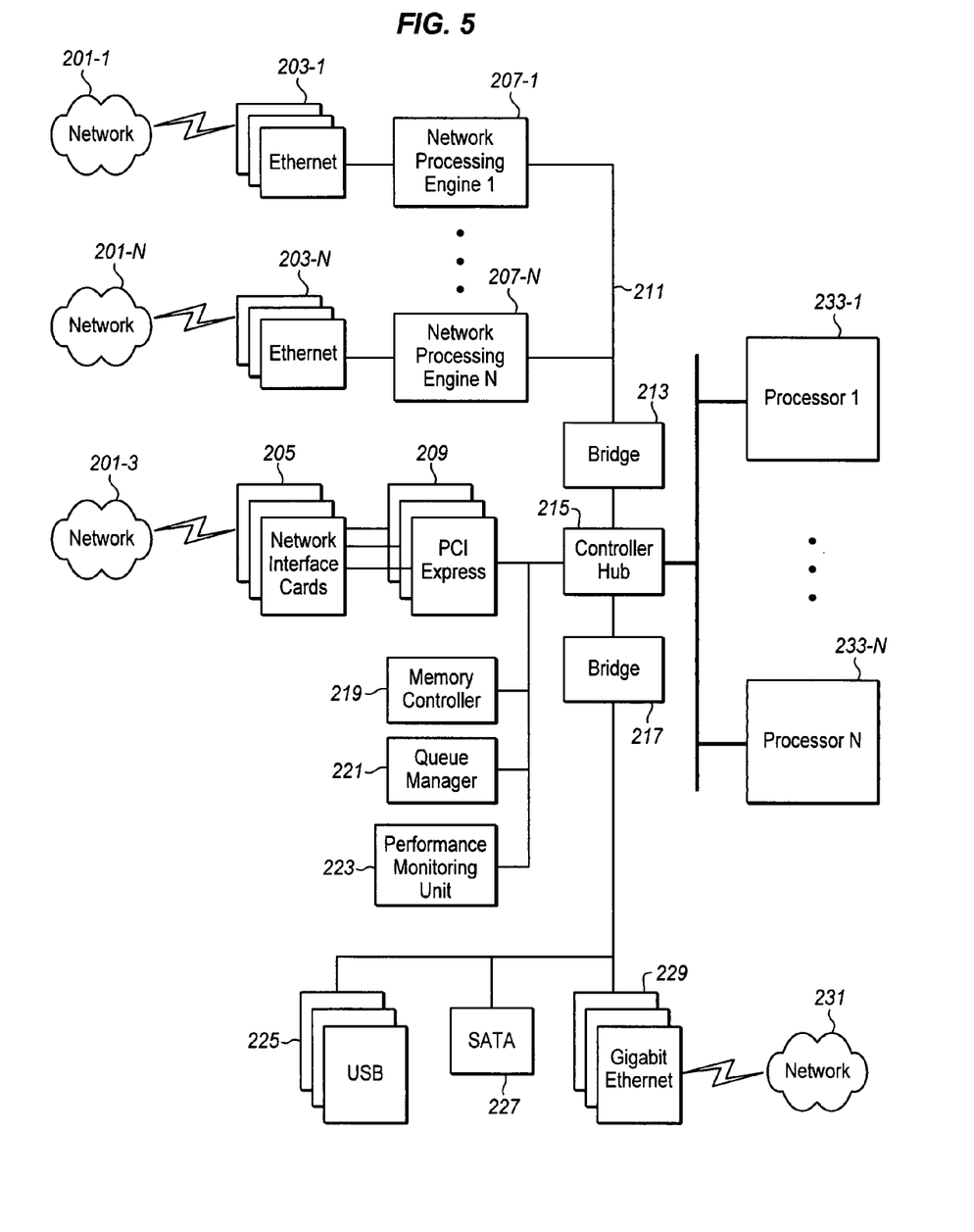
FIG. 5 is a block diagram of a network device suitable for implementing embodiments of the present invention.

FIG. 5 shows a generalized hardware architecture for a switch, router, server, network node or other device that may benefit from the operations and devices described above. The system of FIG. 5 may include all or some of the components shown in FIG. 1 and is intended to be completely consistent with the components and operations described in conjunction with FIG. 1. The system of FIG. 5 is coupled to a network 201 at multiple places or to multiple networks 201-1 to 201-N. The networks are each connected to one or more Ethernet ports 203-1 to 203-N, respectively. These Ethernet ports each connect to a respective NPE (Network Processing Engine 207-1 to 207-N, analogous to the NPE 11 of FIG. 1.

The NPE's are coupled to an internal bus 211 that connects to a bridge 213. The bridge acts as an intermediary between the NPE's and a controller hub 215, similar to the bridge 13 in FIG. 1. The controller hub interconnects the bridge to one or more general purpose processors 233-1 to 233-N on the one side and to a variety of peripheral devices on the other side.

The example hardware configuration of FIG. 5 shows additional connections to the same or a different network 201-3 that may be made through one or more network interface cards (NIC) 205 that connect to one or more PCI Express interfaces 209 to the controller hub. Another alternative or additional option is to connect to the same or another network 231 through Ethernet ports, such as Gigabit Ethernet ports on a separate bus directly to a second bridge 217 without the benefit of a NPE. The second bridge is also coupled to the controller hub. The separate bus, rather than being a dedicated network packet traffic bus is a shared hardware bus that also supports other equipment. In the example of FIG. 5, this other equipment may include a mass storage or other SATA (Serial Advanced Technology Attachment) device 227 and USB (Universal Serial Bus) adapters 225 to support peripheral and user interface devices.

To support other functions as described in the context of FIG. 1, FIG. 5 also shows that the controller hub is also connected to a memory controller 219 analogous to the controller 17 shown in FIG. 1, a queue manager 221 analogous to the queue manager 23 of FIG. 1 and a PMU 223, analogous to the PMU 39 of FIG. 1.

The system may include more or fewer components than those shown in FIG. 1. The number of network connections and the types of network connections may be adapted to suit any of a variety of different implementation. While the network connections may be wired as suggested by FIG. 5, one or more wireless interfaces may be used in addition to, or instead of, those shown. Each network port may correspond to a network interface and queue as discussed above in the context of FIGS. 2, 3, and 4 and some of the network ports may have multiple interfaces and queues. In addition any of the interfaces, such as PCI Express, SATA, USB, Ethernet, etc, may be exchanged for other interfaces to suit any particular application and future technologies. The specific architecture, configuration and interfaces of FIG. 5 are provided only as examples.

Figure 6:
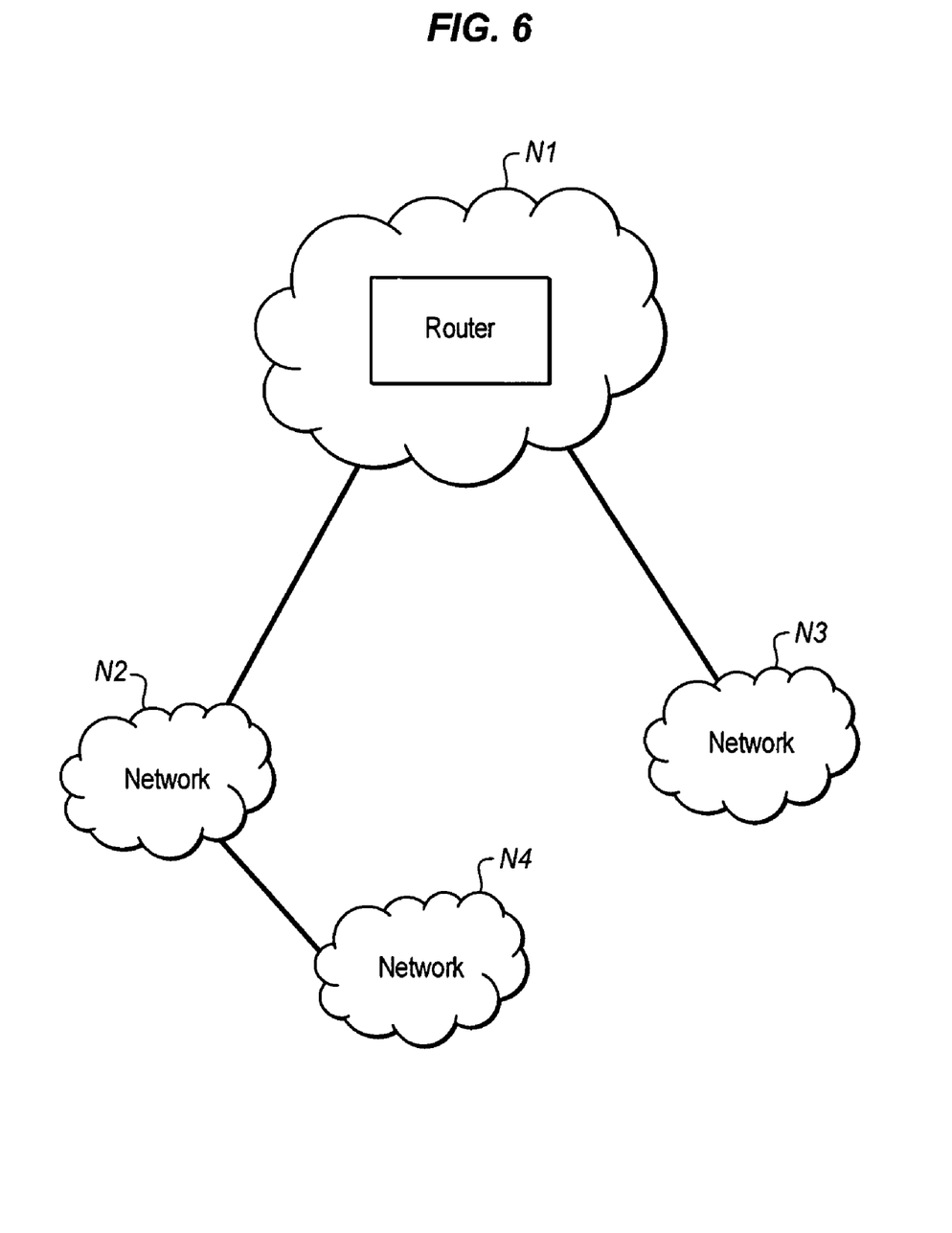
FIG. 6 is a block diagram of set of interconnected networks suitable for implementing embodiments of the present invention.

FIG. 6 shows a general network packet routing context suitable for the use of systems, such as those shown in FIGS. 1 and 5. The network of FIG. 6 shows a router in a first network N1 that is coupled directly to a second network N2 and a third network N3. A fourth network N4 may be reached only through the second network N2 and a switch or router that is resident on that network. Each network in FIG. 6 may have many routers and switches such as the router of FIG. 5. There may also be many more networks with many more complicated connections than those shown. The router of FIG. 5 may be used to route packet traffic to any one or more of the networks of FIG. 6, among others that are not shown.

In the examples described above, QoS (Quality of Service) may be closely monitored and managed. QoS is important for many internet applications such as video streaming, teleconferencing and voice over IP. The methods and apparatus described above further allow ISPs (Internet Service Providers) to provide different levels of traffic flow quality to their customers based on price or the type of traffic that is being sent. The described system and operations allow for self adjusting, optimized QoS network traffic across an entire network. In other words, a complex networking system may dynamically change the priority of internet streams based on real-time network traffic conditions; and also based on internet bandwidth and latency needs of real-time network application software.

In addition, the real-time monitoring of network load status for individual routers may be reported to central hosts using piggy-backed internet packets. This allows remote access, real-time, dynamic, configuration and tracking of the complex networking system's QoS.

The central reporting also allows network traffic loads to be distributed across a complex networking system to reduce wastes of network bandwidth. The networking system may be managed to reduce internet packets dropped at intermediate or end router bottle necks, due to inaccurate or stale queue priority allocations. Management may also be able to dynamically change network routing tables in time to meet real-time network traffic conditions.

By allowing each router to optimize its particular network interfaces for the existing traffic, equilibrium between queues is achieved much faster than with a centralized approach, enhancing the performance of each network interface.

As described above, the router or switch may be equipped with hardware that supports proactively adjusting the queue priorities of all its network interfaces towards equilibrium. This is done using PMU 39 conditions and interrupts and the queue manager design. The same operations may also be performed by a processor including the main central or core processor, depending on the particular application.

The system is further able to dynamically adjust queue priorities based on expected or theoretical processing capabilities of the processor to achieve fast internal network interface load equilibrium without exceeding processor bandwidth. This may prevent packets from being selectively dropped until an entire network system is saturated or overloaded. Accordingly, there are advantages even where there is no optimum routing solution that can provide zero dropped packets.

Finally, the system is able to dynamically and proactively use its internal network interface equilibrium and bandwidth data to inform other devices or the host about its real-time ability to handle additional packet traffic. Based on the methods and apparatus discussed herein, only minimum information is necessary to inform the other devices, for example, the PACKET_COUNT and router IP (Internet Protocol) and MAC (Media Access Control) address which may be easily piggy backed with other internet packets.

While embodiments of the invention have been described in the context of balancing traffic loads on internet traffic packets, the approaches and techniques described here may be applied to a wide variety of different types of data traffic in which there are multiple queues and varying traffic loads. The approaches and techniques here may also be applied to a wide range of other devices capable of communicating using packets with addresses and headers through switched networks. The invention may be applied to local, wide and metropolitan area networks among others.

In the description above, for purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention may include various processes. The processes of the present invention may be performed by hardware components, such as those shown in the figures, or may be embodied in machine-executable instructions, which may be used to cause general-purpose or special-purpose processor or logic circuits programmed with the instructions to perform the processes. Alternatively, the processes may be performed by a combination of hardware and software.

The present invention may be provided as a computer program product which may include a machine-readable medium having stored thereon instructions which may be used to program an agent or a computer system to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of machine-readable media suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

Many of the methods and apparatus are described in their most basic form but steps may be added to or deleted from any of the methods and components may be added or subtracted from any of the described apparatus without departing from the basic scope of the present invention. It will be apparent to those skilled in the art that many further modifications and adaptations may be made. The particular embodiments are not provided to limit the invention but to illustrate it. The scope of the present invention is not to be determined by the specific examples provided above but only by the claims below.

What is claimed is:

1. A method comprising:
   monitoring network packet traffic events for a plurality of network interfaces in a packet processing device;
   comparing the monitored network packet traffic events to a first activity level to determine whether at least one of the network interfaces is near an overflow state;
   if the network interface is near an overflow state, then setting an overflow interrupt status bit in a status register of a queue manager for the corresponding network interface and generating an interrupt to request that packets of the corresponding network interface be processed;
   increasing a priority of the network interface in response to the overflow interrupt by changing a value in an interrupt mask register corresponding to the corresponding network interface for which the overflow interrupt status bit is set.

2. The method of claim 1, further comprising:
   comparing the monitored events to a second activity level to determine whether at least one of the network interfaces is near an underflow state; and
   if the network interface is near an underflow state, then setting an underflow interrupt status bit in the queue manager and generating an interrupt.

3. The method of claim 1, wherein monitoring events comprises counting a number of packet buffer events over a predetermined period of time and wherein comparing comprises comparing the count to a threshold.

4. The method of claim 1, wherein monitoring events comprises monitoring a fill rate of a queue corresponding to the network interface.

5. The method of claim 1, wherein monitoring events comprises monitoring a set of signals in a performance monitoring unit in order to measure network packet queue utilization.

6. The method of claim 1, further comprising determining whether additional bandwidth is available in the packet processing device before increasing the priority and wherein increasing the priority comprises increasing the priority only if additional network bandwidth is available.

7. The method of claim 1, further comprising reporting the overflow state to a central host.

8. A non-transitory machine-readable medium having instructions stored thereon, that when operated on by a processor cause the processor to perform operations comprising:
   determining whether an interrupt has been received;
   if an interrupt has been received, then determining whether the interrupt is for an overflow condition of a network interface by checking status bit registers of a queue manager to determine a status of network interfaces coupled to the queue manager;
   if the interrupt condition is for an overflow condition of a network interface, then increasing a priority of the network interface by writing to an interrupt mask register corresponding to the corresponding network interface for which the overflow interrupt status bit is set, the interrupt mask register being coupled to the queue manager.

9. The medium of claim 8, wherein the operations further comprise if the interrupt condition is for an overflow condition of a network interface, then sending a report to a network host attached to the network serviced by the network interface.

10. The medium of claim 8, wherein the operations further comprise servicing the network interface that caused the interrupt.

11. The medium of claim 8, wherein the interrupt is based on monitoring buffer conditions for the network interface.

12. The medium of claim 8, wherein the operations further comprise if the interrupt condition is for an overflow condition of a network interface, then checking a bandwidth allocation budget to determine whether a higher priority may be provided to the network interface and wherein the instructions for increasing the priority of the network interface comprise increasing the priority of the network interface only if additional bandwidth is available in the bandwidth allocation budget.

13. The medium of claim 12, wherein the bandwidth allocation budget comprises a number of packet tokens.

14. An apparatus comprising:
   a plurality of network interfaces;
   a performance monitoring unit to monitor buffer events for the network interfaces and to generate an interrupt if a network interface buffer is near an overflow state;
   a queue manager having a plurality of status bit registers for each network interface to store an overflow bit in a corresponding status register if a network interface buffer is near an overflow state; and
   a processor to receive the interrupt, to check queue manager status bit registers to determine the status of the network interfaces, and to increase a priority of the associated network interface in response to the checking the status bit registers by changing a value in an interrupt mask register corresponding to the corresponding network interface for which the overflow interrupt status bit is set.

15. The apparatus of claim 14, wherein the performance monitoring unit compares the monitored buffer events to a threshold to determine whether the network interface buffer is near an overflow state.

16. The apparatus of claim 14, wherein the processor maintains a bandwidth allocation budget in a register and determines whether there is available budget before increasing the priority of the network interface.

17. The apparatus of claim 14, wherein the queue manager is further to maintain a packet queue for each network interface and to manage interrupts to the processor for handling packets in each queue and wherein the processor increases the priority by writing to an interrupt mask register coupled to the queue manager.

18. The apparatus of claim 14, wherein the performance monitoring unit further generates an interrupt if the network interface buffer is near an underflow state and wherein the processor receives the underflow state interrupt, checks queue manager status bit registers to determine the status of the network interfaces, and decreases the priority of the associated network interface in response to checking the status bit registers.

* * * * *